United States Patent
Sharma et al.

(10) Patent No.: US 11,573,888 B2
(45) Date of Patent: Feb. 7, 2023

(54) MACHINE LEARNING TEST RESULT ANALYZER FOR IDENTIFYING AND TRIGGERING REMEDIAL ACTIONS

(71) Applicant: Bank of America Corporation, Charlotte, NC (US)

(72) Inventors: Ramesh Sharma, Brampton (CA); Alexander Arkadyev, Thornhill (CA); Richard Liang, Oakville (CA)

(73) Assignee: Bank of America Corporation, Charlotte, NC (US)

( * ) Notice: Subject to any disclaimer, the term of this patent is extended or adjusted under 35 U.S.C. 154(b) by 142 days.

(21) Appl. No.: 17/341,601

(22) Filed: Jun. 8, 2021

(65) Prior Publication Data
US 2022/0391312 A1 Dec. 8, 2022

(51) Int. Cl.
*G06F 11/36* (2006.01)
*G06F 40/279* (2020.01)
*G06F 40/117* (2020.01)
*G06N 20/00* (2019.01)

(52) U.S. Cl.
CPC ........ *G06F 11/3688* (2013.01); *G06F 40/117* (2020.01); *G06F 40/279* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 10,162,741 B2 * | 12/2018 | Kochura | G06N 20/00 |
| 10,430,727 B1 * | 10/2019 | Fusillo | G06Q 30/0269 |
| 10,438,118 B2 | 10/2019 | Dwarakanath et al. | |
| 10,572,374 B2 * | 2/2020 | Sharma | G06F 11/008 |
| 2019/0384699 A1 | 12/2019 | Arbon et al. | |
| 2021/0287109 A1 * | 9/2021 | Cmielowski | G06F 11/3692 |
| 2022/0300400 A1 * | 9/2022 | Bikkina | G06K 9/6282 |
| 2022/0342801 A1 * | 10/2022 | David | G06N 20/00 |

\* cited by examiner

*Primary Examiner* — Isaac Tuku Tecklu
(74) *Attorney, Agent, or Firm* — Weiss & Arons LLP

(57) ABSTRACT

Apparatus and methods for using artificial intelligence to process and remediate test failures are provided. The methods may include monitoring an execution of an automated test on a software application. The automated test may include a plurality of steps. The methods may include receiving a first error message and a second error message during the execution of a step included in the plurality of steps. The methods may include processing each of the first and second error messages individually and, after completion of the step, again as a group. The processing may include determining if the error messages were generated by a defect in the software application.

20 Claims, 4 Drawing Sheets

Results Analyzer Summary: Test Case  
Total Messages Analyzed: 1        ← 401  
Messages analyzed :  
1. [App Defect], Accuracy [71%]  
Verify operation failed. Verification of WEBEDIT [search_flagscape_edit ] failed for these reasons - Expected [holidays], Actual [leaves].

Results Analyzer Summary: Test Case  
Total Messages Analyzed: 1        ← 403  
Messages analyzed :  
1 [Needs Analysis], Accuracy [80%]  
Verify operation failed. Control: search_results_table is not visible in the application.

Results Analyzer Summary: Test Case  
Total Messages Analyzed: 1        ← 405  
Messages analyzed :  
1. [Not an App Defect], Accuracy [72%]  
Unable to convert Json file: 'data/web_services/request_machine_online_2.json' to Text because, file not found Results Analyzer Summary : Test Set        ← 407  
Total Messages Analyzed : 3  
Message category | Count |Min Accuracy | Max Accuracy |  Average Accuracy |  
App Defect | 1|71.0|71.0|71.0|  
Not an App Defect | 1|72.0|72.0|72.0|  
Needs Analysis | 1|80.0|80.0|80.0|

FIG. 4

MACHINE LEARNING TEST RESULT ANALYZER FOR IDENTIFYING AND TRIGGERING REMEDIAL ACTIONS

FIELD OF TECHNOLOGY

Aspects of the disclosure relate to providing apparatus and methods for processing and remediating failures. In particular, the disclosure relates to apparatus and methods for processing and remediating test failures generated during the execution of an automated test on a software application.

BACKGROUND

Automated tests are routinely run on software applications for error identification. When the automated test is complete, a software developer is tasked with reviewing all error messages generated during execution of the automated test. This manual review process can be extremely time consuming, since a single software application can generate hundreds, and sometimes thousands, of errors during an automated test. Some errors identify defects in the software application. However, many errors may be generated by non-application defects, such as a setting in the automated test that is incompatible with the software application. Thus, the software developer is tasked with not only a lengthy review process, but a review process that can be somewhat, if not largely, pointless.

It is desirable, therefore, to provide apparatus and methods for using artificial intelligence ("AI") for processing error messages generated during execution of an automated test to minimize, and optimize, a software developer's review process of automated test results. In exemplary embodiments, for a software testing team running one hundred thousand automated test cases, using the apparatus and methods provided herein can potentially save up to two thousand review hours for the software team.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 4 shows illustrative reports in accordance with the invention.

DETAILED DESCRIPTION

Figure 1:
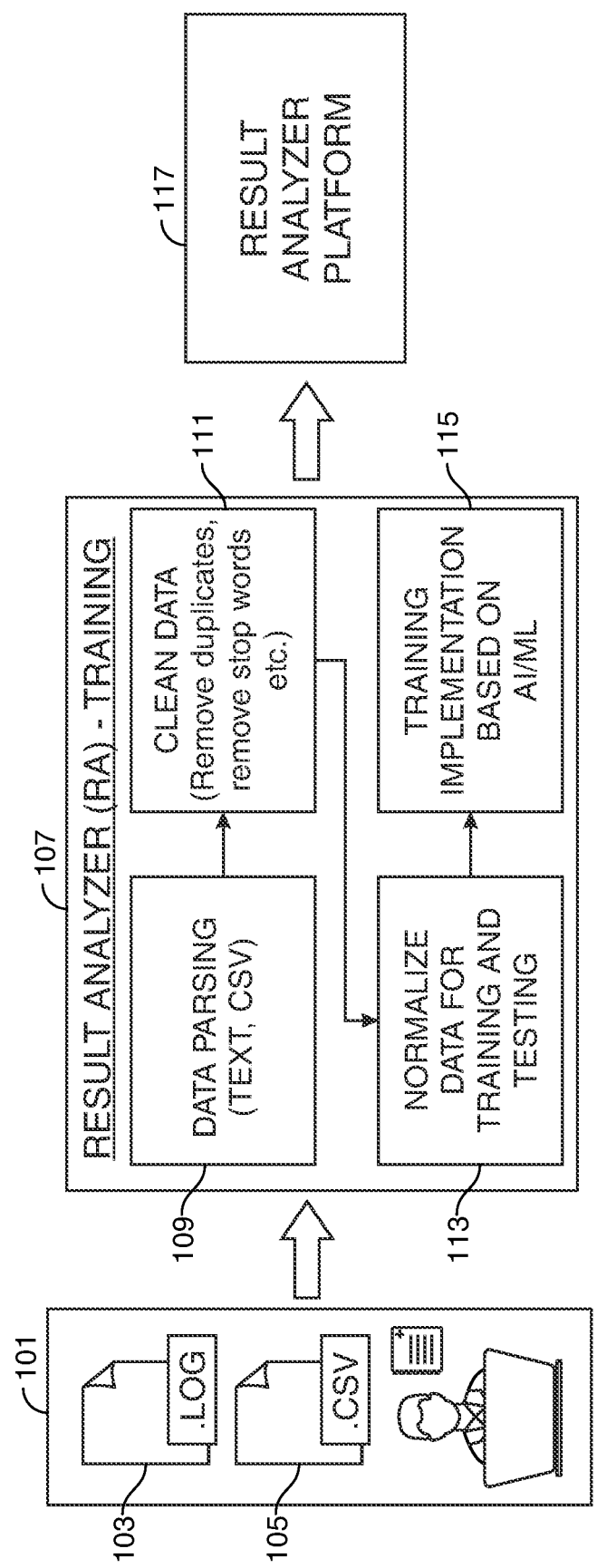
FIG. 1 shows illustrative apparatus and methods in accordance with the invention.

Apparatus and methods for using AI to analyze error messages generated during the testing of a software application are provided. The methods may include monitoring an execution of an automated test on a software application. The automated test may be run using an automated testing suite. The automated test may include a plurality of steps. The methods may include receiving, during the execution of each step included in the plurality of steps, one or more error messages generated by the automated test when running the step on the software application. Each of the error messages may include text detailing the error. The error messages may be test failure messages. The error messages may be any other suitable error messages.

The error messages may be received, or pulled, by a Result Analyzer ("RA") platform. The RA platform may process each error message using a machine learning ("ML") prediction model. The RA platform may also categorize, or 'tag', each error message and, in some embodiments, execute remedial action as described herein.

The processing may include processing natural language included in the error message using the ML prediction model. The methods may include the RA platform executing a call to send the error message to the ML prediction model. The processing may be source agnostic by not reviewing a source of the error message.

The processing executed by the RA platform may include categorizing the error message. The methods may include, for each error message, the ML prediction model selecting a category from a group of categories. An exemplary group of categories includes an application defect, a non-application defect, and needs analysis. Any other suitable group of categories may be used. The categories may be selected, and modified, by a user.

An error message may be categorized as an application defect when the ML prediction model determines that the error message has a more than a threshold probability of being generated by a defect in the software application, such as an error in the coding of the software application which is causing incorrect or unexpected results. An application defect is not caused by a defect in the automated test. An exemplary application defect includes a syntax error. A failure of the software application test to complete may be categorized as an application defect. A software application test may fail to complete when, as a result of an error in a test step, the rest of the test cannot be completed because the remaining steps depend on the failed one.

An error message may be categorized as a non-application defect when the ML prediction model determines that the error message has more than a threshold probability of not being generated by a defect in the software application. Instead, the error message has a likelihood of being generated by the automated test or an incompatibility between the automated test and the software application. For example, an error message may be categorized as a non-application defect when the error message is determined to have been generated because the setting of the browser is at zoom 200% and the automated test needs a zoom of 100% to run properly. Additional errors that may be categorized as a non-application defect include errors determined to be generated because the automated test is failing to run properly, or any other problems relating to the testing environment.

An error message may be categorized as needs analysis when the ML prediction model cannot fit the error message into either the application defect model nor the non-application defect model.

The RA platform may store, and run, the ML prediction model. The ML prediction model may include ML libraries generated during a training of the ML prediction model on a prediction set. The ML prediction model may include a classifier, such as Naïve Bayes, Random Forest, or any other suitable classifier, and a Natural Language Processing ("NLP") algorithm, such as bag-of-words and tf-idf, doc2vec (DBOW approach), doc2vec (PV-DM approach), or any other suitable classifiers and algorithms.

The ML prediction model may be a java library. As such, the ML prediction model may be agnostic to a framework of the automated test and may be configured to be integrated into any type of testing framework.

In some embodiments, the ML prediction model, including the ML libraries, may be stored locally on a computing system executing the automated test. In these embodiments, the ML prediction model may not be stored in a cloud. Instead, the methods may provide offline analysis enabling the implementation of the ML prediction model without requiring internet connection.

In some embodiments, the ML prediction model may be stored on a cloud-based server. In some of these embodiments, the methods may include pushing to the ML prediction model each of the error messages and receiving, from the ML prediction model, the error message classifications. The methods may also include pushing to the ML prediction model data that may be useful in the retraining of the ML prediction model to enhance the accuracy of the classifications.

For example, when an error message is classified as either an application defect or a non-application defect, selectable options of 'right' and 'wrong' may be displayed adjacent to the error message to enable a programmer to input whether or not the prediction was correct. When an error message is classified as 'needs further analysis,' the selectable options of 'application defect' and 'non-application' defect may be displayed adjacent to the error message to enable a programmer to review the error message and select one of the options detailing the source of the error message. The methods may include pushing the metadata including the option(s) selected by the programmer to the cloud server and retraining the ML prediction model using the metadata. The retraining may include updating the prediction set to include the error message with their user-selected classifiers and re-running the training model using the augmented prediction set.

In some embodiments, when the metadata identifies an error message which has been categorized incorrectly by the ML prediction model more than a threshold number of times, the ML prediction model may be retrained using the updated, correct categorization of the error message. This may include removing the old classification of the error message from the training set, updating the training set with the correct classification included in the metadata, and retraining the ML prediction model accordingly. These methods may be especially important because an incorrect categorization in training data may be very detrimental to the accuracy of the ML prediction model. Thus, receiving feedback, updating training data with the feedback, and retraining the ML prediction model may result in significantly improved accuracy of the ML prediction model. Training data may be data included in the training set.

The prediction set may include a plurality of error messages, each of the error messages having been classified using one of the aforementioned classifiers. The NLP algorithm may use linguistics to analyze a grammatical structure of English text of the error message and a meaning of the words included in the error message.

A step of the automated test may generate a first error message and, at a later point in time, a second error message. Upon receipt of the first error message, the methods may include processing the first error message as described above. The methods may include classifying the first error message using a classifier included in a group of classifiers stored by the ML prediction model. For illustrative purposes, the methods are described as classifying the first error message as a non-application defect. The methods may include tagging the error message with the selected classifier. When the first error message has been identified to be a non-application defect, the methods may include tagging the first error message as a non-application defect.

In some embodiments, the methods may include creating an error report for the automated test run on the software application. The methods may also include embedding in the error report a classification assigned to each of the error messages based on results received from the ML prediction model.

The methods may include receiving, after the first error message, and during the execution of the step, a second error message. Upon receipt of the second error message, the methods may include processing the second error message. The processing may include processing natural language included in the second error message using the ML prediction model. The ML prediction model may classify the second error message using a classifier in the group of classifiers. For illustrative purposes, the methods are described as classifying the second error message as an application defect. The methods may include tagging the error message with the selected classifier. When the first error message has been identified to be an application defect, the methods may include tagging the second error message as an application defect.

During the monitoring, the methods may include identifying a completion of the step by the automated test. In response to the identifying the completion of the step, the methods may include reprocessing the first error message and the second error message. The reprocessing may include aggregating into a group all error messages received during the execution of the step.

The reprocessing may include identifying an error message within the group having natural language identifying a fatal error. The fatal error may be an error selected from a group of predefined fatal errors. An exemplary fatal error is a failure of the automated test to complete. The fatal error may be classified as an application defect by the ML prediction model.

In response to the identification of the fatal error message, the methods may include overwriting a tag of each of the error messages in the group with an application defect tag. In these embodiments, reanalyzing the group of error messages upon completion of the step provides enhanced ML outcomes by considering all error messages generated by the step together with the final outcome of the step and using this additional data to classify all the error messages generated during the step.

For example, a step may generate three error messages. The first error message may be 'cannot find control by provided locator' the second error message may be 'cannot find the required value in dropdown,' and the third error message may be 'control is not visible in the application'. The individual processing of error messages one and three may return the classifiers of needs analysis. The individual processing of error message number two may return the classifier of application defect. However, when the step is complete and error messages one, two and three are reprocessed, the ML prediction model may return that all of error messages one, two and three are now classified as an application defect. This may be in response to a determination by the ML prediction model that the second error messages caused the first and second error messages and, since the second error message was classified as an application defect, it follows that the first and third error messages should also be classified as application defects. The final reason for the test step failure may be attributed to an application defect as well.

In some embodiments, if one error message in a group is classified as an application defect, then the reprocessing may automatically classify all error messages in the group as application defects.

In some embodiments, if one error message in a group is classified as an application defect that is a 'fatal error,' then the reprocessing may automatically classify all error messages in the group as application defects. A fatal error may correspond to a failed software application test, such as when the software application test fails to complete. The software application test may be the automated test.

The methods may further include identifying a code update for remediating the fatal error. The identification may be based on accessing a database storing known defective characteristics of the software application and corrective workaround actions associated with the known defective characteristics. The identification may include correlating the fatal error with one of the known defective characteristics and extracting the associated workaround action. The workaround action may include a code update. The code update may be a syntax modification.

The methods may include altering the code of the software application to create a modified software application. The modified software application may include the code update. When the code update is a syntax modification, the altering the code may include modifying the code using the syntax modification.

The methods may include running the step of the automated test on the modified software application. When the running the step of the automated test on the modified software application does not generate the second error message, the methods may include overwriting the software application with the modified software application. When the running of the automated test on the modified software application generates the second error message, the methods may include purging the modified software application and restarting the automated test on the software application at the step.

When the ML prediction model is run on a server, the methods may include pushing to the ML prediction model the code update and the result of the running of the automated test on the modified software. The methods may also include retraining the ML prediction model using the result.

The monitoring of the automated test may include tallying a number of error messages generated during the steps included in the automated test and, when the number exceeds a threshold number during one of the steps, terminating the automated test. For example, if 80% of test cases are failing, the methods may include terminating the execution of the automated test and determining a percentage of the error messages associated with an application defect and a percentage of the error messages associated with a non-application defect.

The monitoring of the automated test may include tallying a number of error messages generated during each individual step. When the number exceeds a threshold number for one of the steps, the methods may include terminating the step and instructing the automated test to proceed with the execution of step subsequent to the step generating the large number of error messages. When the number exceeds a threshold number for one of the steps, the methods may include temporarily excluding the step from the execution, queuing it for remedial action, and instructing the automated test to proceed with the execution of step subsequent to the step generating the large number of error messages.

The software application may be one of a plurality of software applications. The methods may include running the automated test on each of the plurality of software applications. The methods may include maintaining a count of a number of times the automated test fails at each of the steps included in the automated test because of non-application defect issues during the running of the plurality of the software applications. When, for a step, the count is greater than a threshold value, the methods may include temporarily excluding the step from the execution and queuing it for remedial action. These methods may enable the detection and removal of flaky scripts from the automated test. A flaky script may run defective test data and/or include incorrect functionalities that fail often and create false error messages—i.e. error messages that do not identify application defects in the software applications, but rather errors in the automated test itself.

As set forth above, the classifiers used by the ML prediction model may be any suitable classifiers. For example, in some embodiments, the application defect may be alternately classified as a 'first classifier defect' and the non-application defect may be alternately classified as a 'second classifier defect.' As such, in the exemplary embodiments described herein, the ML prediction model may identify the first error message as a first classifier defect and the second error message as a second classifier defect. These embodiments may include some or all of the method steps described above which include the 'application defect' and 'non-application defect' classifiers.

The apparatus and methods of the invention may include apparatus for identifying and triggering remedial actions using artificial intelligence ("AI") to reprogram code of a software application. The apparatus may include the automated testing suite. The automated testing suite may include an automated testing suite processor configured to execute the automated test on a software application. The automated test may include a plurality of steps.

During execution of a step included in the plurality of steps, the automated testing suite processor may generate a first error message upon the detection of a first error and, after the generating of the first error message, generate a second error message upon the detection of a second error.

The automated testing suite may also include an automated testing suite transmitter. The automated testing suite transmitter may be configured to transmit the first error message to the RA platform and to transmit the second error message to the RA platform.

The RA platform may include a RA platform receiver configured to receive the first error message and the second error message from the automated testing suite.

The RA platform may also include a RA platform processor configured to monitor the execution of the automated test on the software application and, upon receipt of the first error message, process the first error message using a machine learning ("ML") prediction model. The ML prediction model may classify the first error message as a first classifier defect.

Upon receipt of the second error message, the RA platform processor may process the second error message using the ML prediction model. The ML prediction model may classify the second error message as a second classifier defect.

During the monitoring, the RA platform may identify a completion of the step by the automated test. In response to the identifying the completion of the step, the RA platform processor may reprocess the first error message and the second error message. The reprocessing may include aggregating into a group all error messages received by the RA platform during the execution of the step, identifying the second error message within the group, and, in response to identifying the second error message within the group, classifying each of the error messages within the group as a second classifier defect.

The RA processor may be further configured to identify a code update for remediating the second error message. The RA processor may alter the code of the software application to create a modified software application, the modified software application including the code update.

The RA processor may be configured to instruct the automated testing suite to run the step of the automated test on the modified software application, the instructing including the modified software application. The automated testing suite processor may run the modified software application upon receipt of the instructions from the RA processor and transmit to the RA platform an error report.

In some embodiments, the RA platform processor may be configured to return a null value when searching the error report for the second error message and, after returning the null value, overwrite the software application with the modified software application.

The ML prediction model may identify the second error message as second classifier defect when the second error message has more than a threshold probability of being generated by a defect in the software application and not being generated by a defect of the automated test.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows illustrative apparatus and methods in accordance with the invention. FIG. 1 shows training set 101 being fed into RA training model 107. Training set 101 may include log files 103 and/or csv files 105. The RA training module 107 may be used to create Result Analyzer Package 117. Result Analyzer Package 117 may be run on the RA platform. Result Analyzer Package 117 may be the ML prediction model described herein.

The RA training module 107 may process training set 101 by executing steps 109 to 115. At step 109, RA training module 107 may extract text from the log files. Illustrative log files may be text files with many lines of text. RA training module 107 may go into these files and extract relevant failure message and create categories for each message. The CSV files may be created manually and imported into RA training module 107.

At step 111, RA training module 107 may clean the extracted data by removing duplicate words, stop words, fixing spelling errors, etc.

At step 113, RA training module 107 may normalize the data for training and testing. This may include ensuring that all text is in lower case and that there are no repeated words. The normalized data may be the training data described herein. The normalized data may form the training set described herein. At step 115, RA training module 107 may train the ML algorithm using the data.

In some embodiments, the training model used to train the ML algorithm may be a file separate from the ML prediction model. In these embodiments, there may be no integration between the ML prediction model and the training model.

Figure 2:
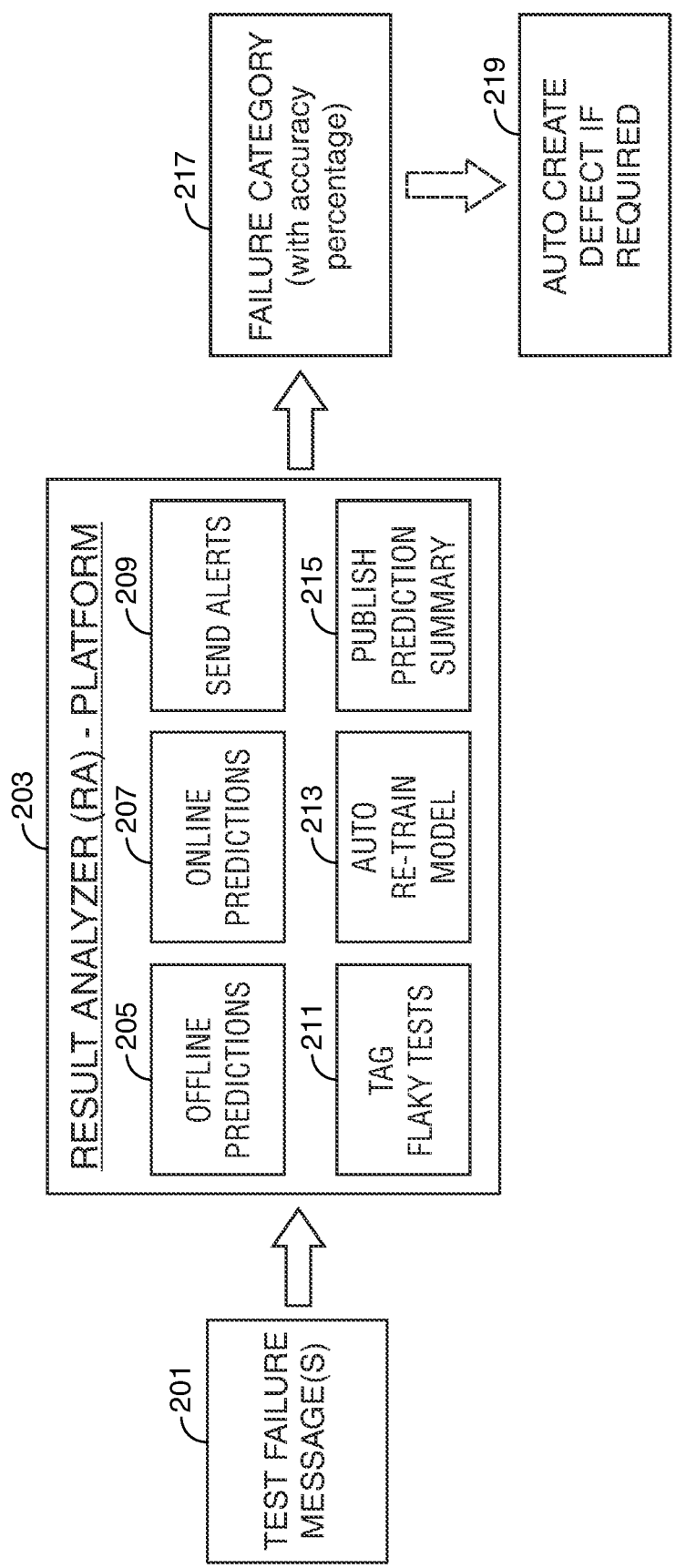
FIG. 2 shows illustrative apparatus and methods in accordance with the invention.

FIG. 2 shows illustrative apparatus and methods in accordance with the invention. In FIG. 2, test failure messages 201 may be fed to RA platform 203. When RA platform 203 is stored locally on a computing system, RA platform 203 may output offline predictions 205. When RA platform 203 is stored on a server, RA platform 203 may output online predictions 207. In some embodiments, RA platform 203 may use test failure messages 201 to send alerts 209 to one or more personnel.

RA platform 203 may use test failure messages 201 to identify and tag flaky tests 211 as described above. RA platform 203 may auto re-train model 213 when it receives metadata identifying an incorrect classification of an error message. In some embodiments, RA platform 203 may publish prediction summary 215, which may include the received test failure messages 201 in addition to either the offline predictions 205 or the online predictions 207. The prediction of each failure message may be included next to the text of the failure message, as illustrated in FIG. 4.

RA platform 203 may output failure category 217 which may include, in some embodiments, an accuracy percentage. Failure category 217 may be a classification as described herein. If a failure is classified as an application defect, auto create defect if required 219 may be initiated to compare test steps leading up to the failure with a description of existing system defects, and, if no existing defect is found, automatically create a new defect. In some of these embodiments, the test steps leading to the failure may be compared with defects linked to the failing test case using NLP.

Figure 3:
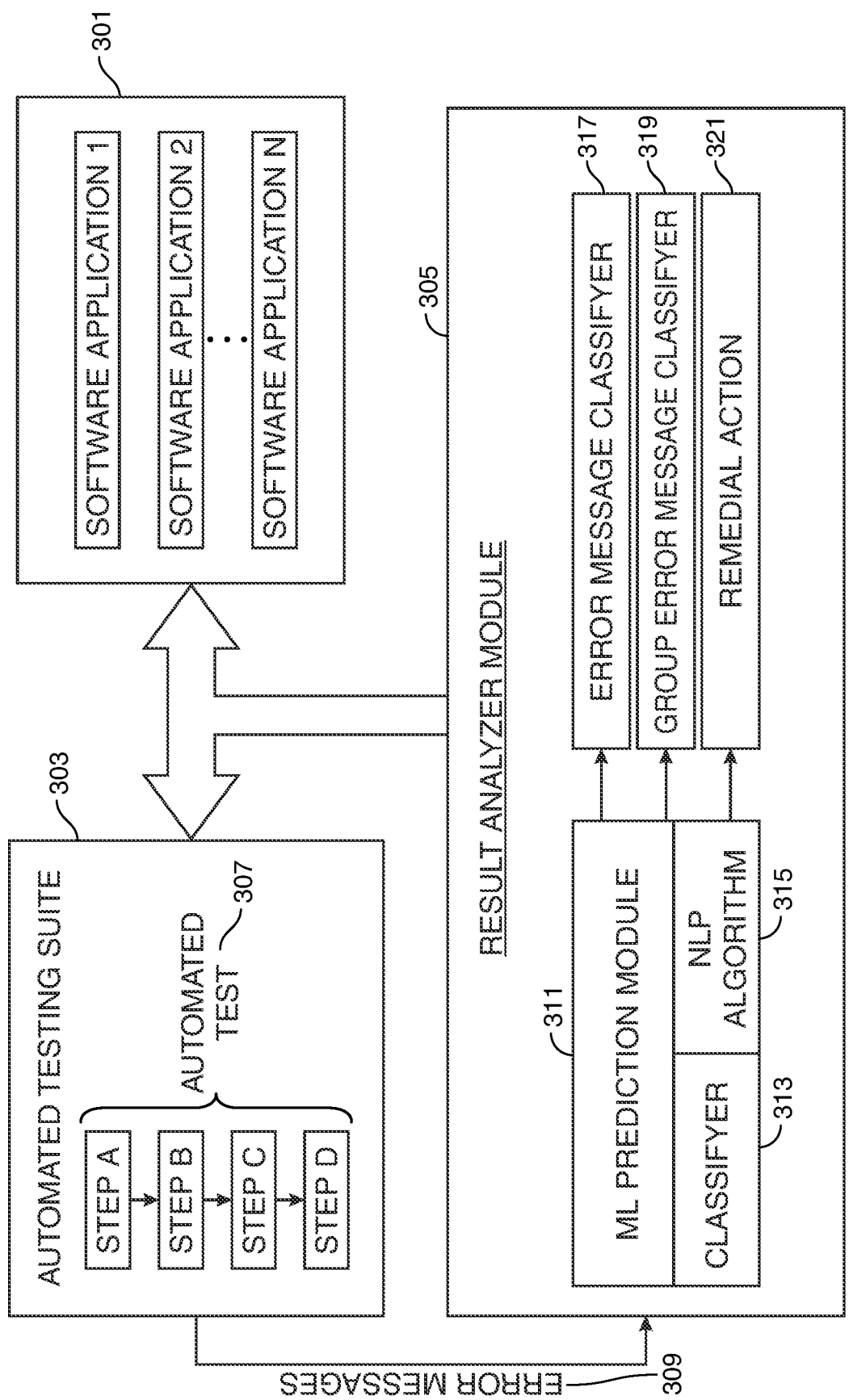
FIG. 3 shows illustrative apparatus and methods in accordance with the invention.

FIG. 3 shows illustrative apparatus and methods in accordance with the invention. In FIG. 3, automated testing suite 303 is shown executing automated test 307 including step A, step B, step C and step D. Software applications 301 are shown including software applications 1 . . . n. Software applications 301 may be tested by automated testing suite 303.

Result Analyzer Module 305 may include ML prediction model 311. ML prediction model 311 includes classifier 313 and NLP algorithm 314.

Automated testing suite 303 may run automated test 307 on one, some, or all of software applications 301. Error messages 309 generated by automated test 307 may be fed into ML prediction model 311. ML prediction model 311 may process each of error messages 309. ML prediction model 311 may output error message classifier 317 for each of error messages 309. When a step of automated test 307 is complete, ML prediction model 311 may output group error classifier 319 for a group of error messages generated by automated testing suite 303 when it was running the step. In some embodiments, group error classifier 319 may overwrite error message classifier 317 for the error messages in the group. ML prediction model 311 may also output remedial action 312. Remedial action 312 may include any of the remedial action described herein for remediating application defects and/or automated testing defects.

The RA platform, automated testing suite and ML prediction module may include one or more computer systems, platforms, and servers. The computer systems, platforms, and servers may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory. The source database may be part of a computer system. The target database may be part of a computer system.

Computer systems and servers may include RAM, ROM, an input/output ("I/O") module and a non-transitory or non-volatile memory. Machine-readable memory may be configured to store information in machine-readable data structures. The I/O module may include a microphone, button and/or touch screen which may accept user-provided input. The I/O module may include one or more of a speaker for providing audio output and a video display for providing textual, audiovisual and/or graphical output.

Software applications executed by the computer systems and servers may be stored within the non-transitory memory and/or other storage medium. Software applications may provide instructions to the processor that enable the computing system to perform various functions. The instructions may include any of the AI methods and processes described herein. For example, the non-transitory memory may store software applications such as the ML learning algorithms and associated databases. Alternatively, some or all of computer executable instructions of a software application may be embodied in hardware or firmware components of a computer system or server.

Software applications may include computer executable instructions for invoking user functionality related to communication, such as email, short message service ("SMS"), and voice input and speech recognition applications. Software application programs may utilize one or more algorithms that process received executable instructions, perform power management routines or other suitable tasks.

Software applications may utilize computer-executable instructions, such as program modules, executed by a processor. Generally, program modules include routines, programs, objects, components, data structures, etc. that perform particular tasks or implement particular abstract data types. A computing system may be operational with distributed computing environments where tasks are performed by remote processing devices that are linked through a communications network. In a distributed computing environment, program modules may be located in both local and remote computer storage media including memory storage devices. Computing systems may rely on a network of remote servers hosted on the Internet to store, manage, and process data (e.g., "cloud computing" and/or "fog computing").

A computer system and server may be part of two or more networks. A computing system may support establishing network connections to one or more remote computing systems. Illustrative network connections may include a local area network ("LAN") and a wide area network ("WAN"). When used in a LAN networking environment, a computing system may be connected to the LAN through a network interface or adapter. A computing system may include a communication circuit. The communication circuit may include a network interface card or adapter.

When used in a WAN networking environment, a computer system and server may include a modem, antenna or other circuitry for establishing communications over a WAN, such as the Internet. The communication circuit may include a modem and/or antenna.

The existence of any of various well-known protocols such as TCP/IP, Ethernet, FTP, HTTP and the like is presumed, and a computing system may be operated in a client-server configuration to permit a user to retrieve web pages from a web-based server. Web browsers can be used to display and manipulate data on web pages.

Computer systems and servers may include components, such as a display, battery, speaker, and antennas. Components of a computer system and server may be linked by a system bus, wirelessly or by other suitable interconnections. Components of a computer system and server may be present on one or more circuit boards. In some embodiments, the components may be integrated into a single chip. The chip may be silicon-based.

FIG. 4 shows an illustrative output of the RA platform. FIG. 4 illustrates exemplary error message report 401, error message report 403 and error report message 405. FIG. 4 also illustrates exemplary summary report 407 for error message reports 401, 403 and 405. Error message report 401 has been classified as application defect with an accuracy of 71%. Error message report 403 has been classified as needs analysis with an accuracy of 80%. Error message report 405 has been classified as a non-application defect with an accuracy of 72%. Summary report 407 lists the number of messages categorized as an application defect, the number of messages categorized as a non-application defect, and the number of messages categorized as need analysis. Summary report 407 also lists a minimum accuracy, maximum accuracy, and average accuracy for each of the aforementioned three categories.

Thus, systems and methods for the processing and remediation of test errors are provided. Persons skilled in the art will appreciate that the present invention can be practiced by other than the described embodiments, which are presented for purposes of illustration rather than of limitation.

What is claimed is:

1. A method for using artificial intelligence ("AI") to reprogram code of a software application, the method comprising:
   monitoring an execution of an automated test on the software application, the automated test including a plurality of steps;
   receiving, during the execution of a step included in the plurality of steps, a first error message;

upon receipt of the first error message, processing natural language included in the first error message using a machine learning ("ML") prediction model, the processing being source agnostic by not reviewing a source of the first error message, wherein the ML prediction model identifies the first error message as a non-application defect;

tagging the first error message as a non-application defect;

receiving, after the first error message, and during the execution of the step, a second error message;

upon receipt of the second error message, processing natural language included in the second error message using the ML prediction model, wherein ML prediction model identifies the second error message as an application defect;

tagging the second error message as an application defect;

during the monitoring, identifying a completion of the step by the automated test;

in response to the identifying the completion of the step, reprocessing the first error message and the second error message, wherein the reprocessing includes:
 aggregating into a group all error messages received during the execution of the step;
 identifying an error message within the group having natural language identifying a fatal error; and
 in response to the identification of the fatal error, overwriting a tag of each of the error messages in the group with an application defect tag;

identifying a code update for remediating the fatal error;

altering the code of the software application to create a modified software application, the modified software application including the code update;

running the step of the automated test on the modified software application;

when the running the step of the automated test on the modified software application does not generate the second error message, overwriting the software application with the modified software application; and when the running of the automated test on the modified software application generates the second error message, purging the modified software application and restarting the automated test on the software application at the step;

wherein the ML prediction model:
 identifies the first error message as a non-application defect when the first error message has more than a threshold probability of not being generated by a defect in the software application; and
 identifies the second error message as an application defect when the second error message has more than a threshold probability of being generated by a defect in the software application.

2. The method of claim 1 wherein the ML prediction model includes a classifier and a Natural Language Processing ("NLP") Algorithm.

3. The method of claim 1 wherein the monitoring includes tallying a number of error messages generated during the step and, when the number exceeds a threshold number, terminating the automated test.

4. The method of claim 1 wherein the monitoring includes tallying a number of error messages generated during the step and, when the number exceeds a threshold number, terminating the step of the automated test and instructing the automated test to proceed with the execution of a subsequent step.

5. The method of claim 1 wherein the fatal error is a failure of the software application test to complete.

6. The method of claim 1 wherein, when the code update is a syntax modification, the altering the code includes modifying the code using the syntax modification.

7. The method of claim 1 wherein the ML prediction model is a java library and is agnostic to a framework of the automated test.

8. The method of claim 1 wherein the ML prediction model is not stored in a cloud.

9. The method of claim 1, when the ML prediction model is stored on a cloud-based server, the method further comprising:
 pushing to the ML prediction model the code update and a result of the running of the automated test on the modified software application; and
 retraining the ML prediction model using the result.

10. The method of claim 1 wherein the software application is one of a plurality of software applications, the method further comprising:
 running the automated test on each of the plurality of software applications;
 maintaining a count of a number of times the automated test fails at the step as a result of failures classified as non-application defects; and
 when the count is greater than a threshold value, temporarily excluding the step from the automated test and queuing the step for remedial action.

11. A method for using artificial intelligence ("AI") to reprogram code of a software application, the method comprising:
 monitoring an execution of an automated test on the software application, the automated test including a plurality of steps;
 receiving, during the execution of a step included in the plurality of steps, a first error message;
 upon receipt of the first error message, processing the first error message using a machine learning ("ML") prediction model, wherein the ML prediction model identifies the first error message as a first classifier defect;
 tagging the first error message as a first classifier defect;
 receiving, after the first error message, and during the execution of the step, a second error message;
 upon receipt of the second error message, processing second error message using the ML prediction model, wherein ML prediction model identifies the second error message as a second classifier defect;
 tagging the second error message as a second classifier defect;
 during the monitoring, identifying a completion of the step by the automated test;
 in response to the identifying the completion of the step, reprocessing the first error message and the second error message, wherein the reprocessing includes:
  aggregating into a group all error messages received during the execution of the step;
  identifying the second error message within the group tagged with the second classifier defect; and
  in response to the identification of the second classifier defect, overwriting a tag of each of the error messages in the group with the second classifier defect;
 identifying a code update for remediating the second error message;
 altering the code of the software application to create a modified software application, the modified software application including the code update;
 running the step of the automated test on the modified software application;

when the running the step of the automated test on the modified software application does not generate the second error message, overwriting the software application with the modified software application; and when the running of the automated test on the modified software application generates the second error message, purging the modified software application and restarting the automated test on the software application at the step;

wherein the ML prediction model identifies the second error message as second classifier defect when the second error message has more than a threshold probability of being generated by a defect in the software application and not being generated by a defect of the automated test.

12. The method of claim 11 wherein the ML prediction model identifies the first error message as a first classifier defect when the first error message has more than a threshold probability of not being generated by a defect in the software application.

13. The method of claim 12 wherein the first classifier defect is a non-application defect and the second classifier defect is an application defect.

14. The method of claim 11 wherein the ML prediction model includes a classifier and a Natural Language Processing ("NLP") Algorithm.

15. The method of claim 11 wherein the ML prediction model is a java library and is agnostic to a framework of the automated test.

16. Apparatus for identifying and triggering remedial actions using artificial intelligence ("AI") for reprogramming code of a software application, the apparatus comprising:

an automated testing suite including an automated testing suite processor configured to:

execute an automated test on the software application, the automated test including a plurality of steps; and during execution of a step included in the plurality of steps, generate a first error message upon detection of a first error and, after generating the first error message, generate a second error message upon detection of a second error;

the automated testing suite further comprising an automated testing suite transmitter configured to transmit the first error message to a result analyzer ("RA") platform and to transmit the second error message to the RA platform;

the RA platform including a RA platform receiver configured to receive the first error message and the second error message from the automated testing suite;

the RA platform further comprising a RA platform processor configured to:

monitor the execution of the automated test on the software application;

upon receipt of the first error message, process the first error message using a machine learning ("ML") prediction model, the ML prediction model classifying the first error message as a first classifier defect;

upon receipt of the second error message, process the second error message using the ML prediction model, the ML prediction model classifying the second error message as a second classifier defect;

during the monitoring, identifying a completion of the step by the automated test;

in response to the identifying the completion of the step, reprocessing the first error message and the second error message, the reprocessing including:

aggregating into a group all error messages received by the RA platform during the execution of the step;

identifying the second error message within the group; and in response to identifying the second error message within the group, classifying each of the error messages within the group as a second classifier defect;

identifying a code update for remediating the second error message;

altering the code of the software application to create a modified software application, the modified software application including the code update; and instructing the automated testing suite to run the step of the automated test on the modified software application, the instructing including the modified software application;

the automated testing suite processor being further configured to run the modified software application and transmit to the RA platform an error report; and the RA platform processor being further configured to:

return a null value when searching the error report for the second error message; and overwrite the software application with the modified software application;

wherein the ML prediction model identifies the second error message as second classifier defect when the second error message has more than a threshold probability of being generated by a defect in the software application and not being generated by a defect of the automated test.

17. The apparatus of claim 16 wherein the ML prediction model identifies the first error message as a first classifier defect when the first error message has more than a threshold probability of not being generated by a defect in the software application.

18. The apparatus of claim 17 wherein the first classifier defect is a non-application defect and the second classifier defect is an application defect.

19. The apparatus of claim 16 wherein the ML prediction model includes a classifier and a Natural Language Processing ("NLP") Algorithm.

20. The apparatus of claim 16 wherein the ML prediction model is a java library and is agnostic to a framework of the automated test.

* * * * *